United States Patent [19]

Breda

[11] Patent Number: 5,608,522
[45] Date of Patent: Mar. 4, 1997

[54] LASER VELOCIMETRIC AND CLINOMETRIC PROBE

[75] Inventor: Jean M. Breda, Paris, France

[73] Assignee: Sextant Avionique, France

[21] Appl. No.: 312,807

[22] Filed: Sep. 27, 1994

[30]     Foreign Application Priority Data

Sep. 29, 1993 [FR] France ................... 93 11568

[51] Int. Cl.[6] ................................................. G01B 9/02
[52] U.S. Cl. .................... 356/345; 356/28.5; 356/338
[58] Field of Search ................... 356/28.5, 345, 356/351, 349, 28, 336, 338

[56]             References Cited

U.S. PATENT DOCUMENTS

| 4,838,687 | 6/1989 | Pfeifer .................................... 356/349 |
| 5,047,653 | 9/1991 | Garcia et al. ............................ 356/345 |

FOREIGN PATENT DOCUMENTS

| 0406061 | 1/1989 | European Pat. Off. . |
| 3833659 | 3/1989 | Germany . |
| 2260052 | 3/1991 | United Kingdom . |

OTHER PUBLICATIONS

Journal of Physics E. Scientific, Instruments, vol. 18, No. 8, Aug. 1985, Bristol GB, pp. 684–688; R. H. Bahnen et al, "Two-component . . . Flows", pp. 684–685.

Electronics & Communications In Japan, Part II–Electronics, vol. 72, No. 1, 'Two-dimensional Laser Doppler Velocimeter Using Pulse-Modulated Laser Diodes' Jan. 1989, New York, US, pp. 89–96, XP119270, Fukuota et al.

*Primary Examiner*—Frank Gonzalez
*Assistant Examiner*—Robert Kim
*Attorney, Agent, or Firm*—Graham & James LLP

[57]            ABSTRACT

The invention relates to a laser velocimetric probe which includes a laser generator, a beam splitter, and a back scattering lens with an output to measuring devices for determining the velocity of a particle passing through a fringe field from a signal representing the light backscattered by the particle. The beam splitter simultaneously generates at least two fringe systems and the measuring devices are arranged for determining at least two components of the particle velocity by frequency analysis of the signal.

6 Claims, 2 Drawing Sheets

LASER VELOCIMETRIC AND CLINOMETRIC PROBE

BACKGROUND OF THE INVENTION

1. Field of the Invention

The present invention relates to a laser velocimetric probe and, more particularly, to a probe which includes means for generating interference fringes and measurement means for determining the velocity of a particle passing through the fringe field from a signal representing the light backscattered by this particle.

2. Discussion of Related Art

Velocimetric probes of this already known type generally consist of the following elements:

- a collimated coherent light source, such as a diode laser, delivering a light beam at a wavelength $\lambda$;
- an optical splitter giving, from the beam emitted by the source, two mutually parallel identical beams separated by a distance a;
- an optical collimation device which focuses the previous beams at a distance F from its exit face. It may be demonstrated that, in the focusing zone, the two beams interfere. The interference field consists of straight, parallel fringes, the fringe spacing of which is given by:

$$i = \lambda F/a$$

- an optical reception device which forms the image of the focusing zone on a photoreceiver;
- this photoreceiver and its control electronics;
- an electronic processing unit giving an item of velocity information from the information coming from the photoreceiver.

Such a probe operates in the following manner.

When a particle passes through the fringe field, it backscatters the light toward the optical reception device and the photoreceiver. This light signal is modulated by the fringe field. It may be demonstrated that the temporal modulation frequency f is given by $$f = v_x/i$$

where $v_x$ is the particle velocity in the direction perpendicular to the fringes.

The electronic processing unit enables the frequency f, and therefore the velocity $v_x$, to be obtained, for example by the Fourier transform method.

Such a probe enables just one component of the particle velocity to be determined. When it is desired to know two or three components, so as to determine the velocity and the incidence of the particle with respect to the probe, two or three optical heads are used, the fringe fields of which are mutually perpendicular. Such an arrangement has the two drawbacks of taking up a lot of space and of doubling or tripling the cost of the system.

SUMMARY OF THE INVENTION

The present invention aims to overcome these drawbacks.

For this purpose, the subject of the invention is a laser velocimetric probe which includes means for simultaneously generating at least two interference fringe systems in a single measurement volume and measurement means for determining at least two components of the velocity of a particle passing through the fringe field from a signal representing the light backscattered by this particle, characterized in that said fringe systems have the same wavelength and that the measurement means are arranged in order to determine said at least two components of the particle velocity by frequency analysis of said signal.

Now, not two beams but N, especially 3 or 4, beams are therefore used. It may be demonstrated that the interference volume is then composed of N(N−1) fringe patterns, each of these patterns being characterized by its intensity, its fringe spacing and the inclination of its fringes with respect to an axis taken as reference.

When a particle passes through one of the patterns, it backscatters a light intensity, the temporal modulation frequency of which is proportional to the component of its velocity on an axis perpendicular to this same pattern. In the general case, the interference of N beams therefore gives N(N−1) signals in frequency space when a particle passes through the measurement volume. Frequency analysis therefore enables a number of components of the particle velocity to be obtained.

In a particular embodiment of the probe according to the invention, the means for generating the interference fringe systems comprise means for forming four parallel laser beams, these four beams being able, especially, to form the edges of a prism having a rhomb shaped or rectangle shaped base, and more particularly a square shaped base.

The interference of four beams gives six fringe patterns in the general case, that is six items of frequency information. It may be shown that, in the special case where the beams are arranged along the edges of a prism having a rhomb shaped or rectangle shaped base, the number of patterns reduces to four. In this configuration, there are therefore four peaks in frequency space.

It will be noticed that, in a velocimetric probe as described hereinabove, there remains an indeterminacy regarding the projection axis corresponding to each of the measured velocities. This indeterminacy may be lifted in various ways.

Firstly, the fringe system may be generated using laser beams of different intensities, thereby making it possible to differentiate the frequency peaks and thus to obtain the desired information.

It is also possible to eliminate, selectively and temporarily, at least one of the fringe systems.

For this purpose, it may be observed that most diode lasers, and lasers in general, emit strongly polarized beams. The beams which interfere here are therefore polarized, generally linearly.

If the polarization of one or more beams is varied, one or more interference patterns are thus eliminated. Knowing the patterns which are eliminated and knowing the modulation frequencies which simultaneously disappear, the indeterminacy regarding the component of the velocity is lifted.

The change in polarization may be achieved, for example, by mechanical rotation of a half-wave plate in one or more beams, or by insertion of an electrically controlled Faraday rotator, or of an electrooptic component, or of a liquid crystal in one of the beams.

It is also possible to eliminate one or more beams using a mask.

BRIEF DESCRIPTION OF THE DRAWINGS

A particular embodiment of the invention will now be described by way of non-limiting example, with reference to the appended drawings in which.

DETAILED DESCRIPTION OF THE PREFERRED EMBODIMENTS

Figure 1:
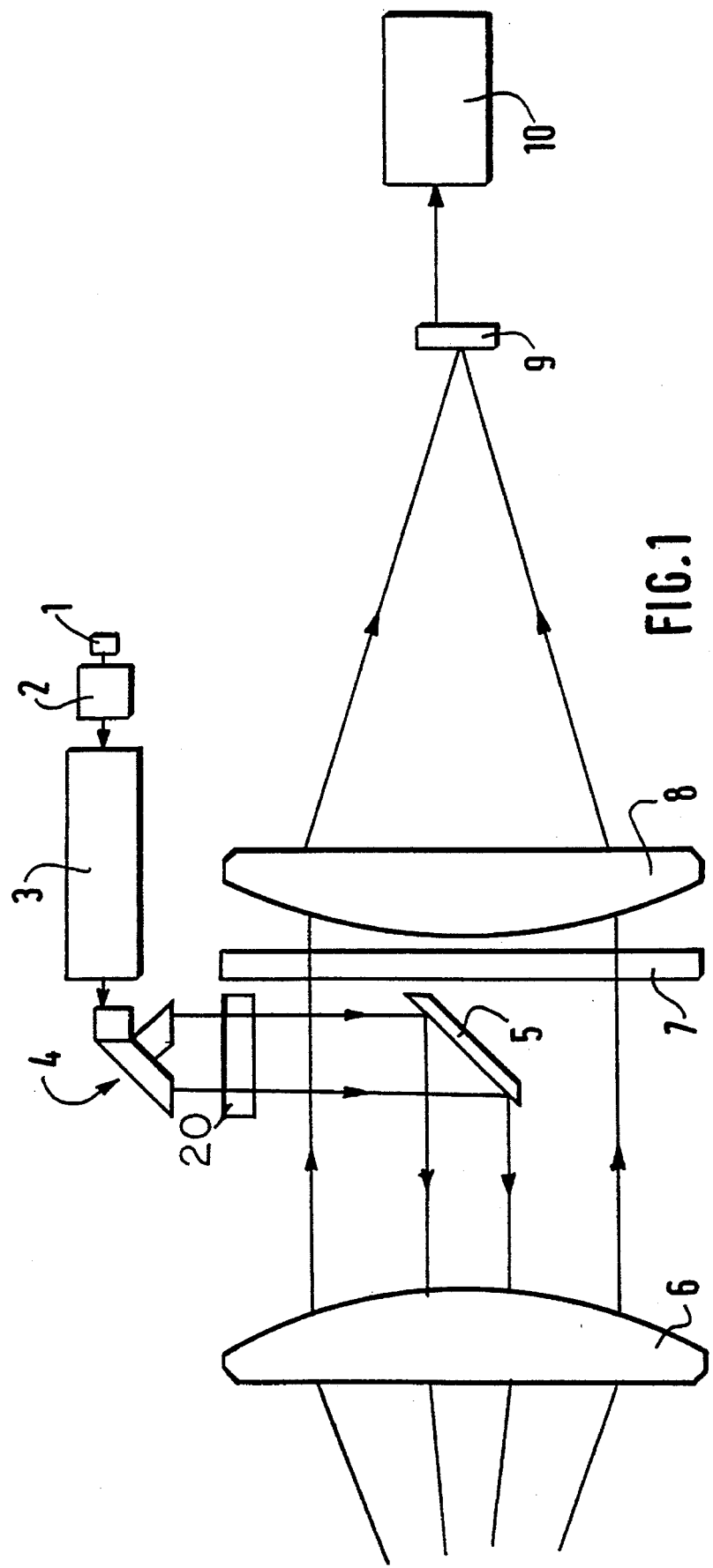
FIG. 1 is a diagrammatic representation of a velocimetric probe according to the invention.
Figure 2:
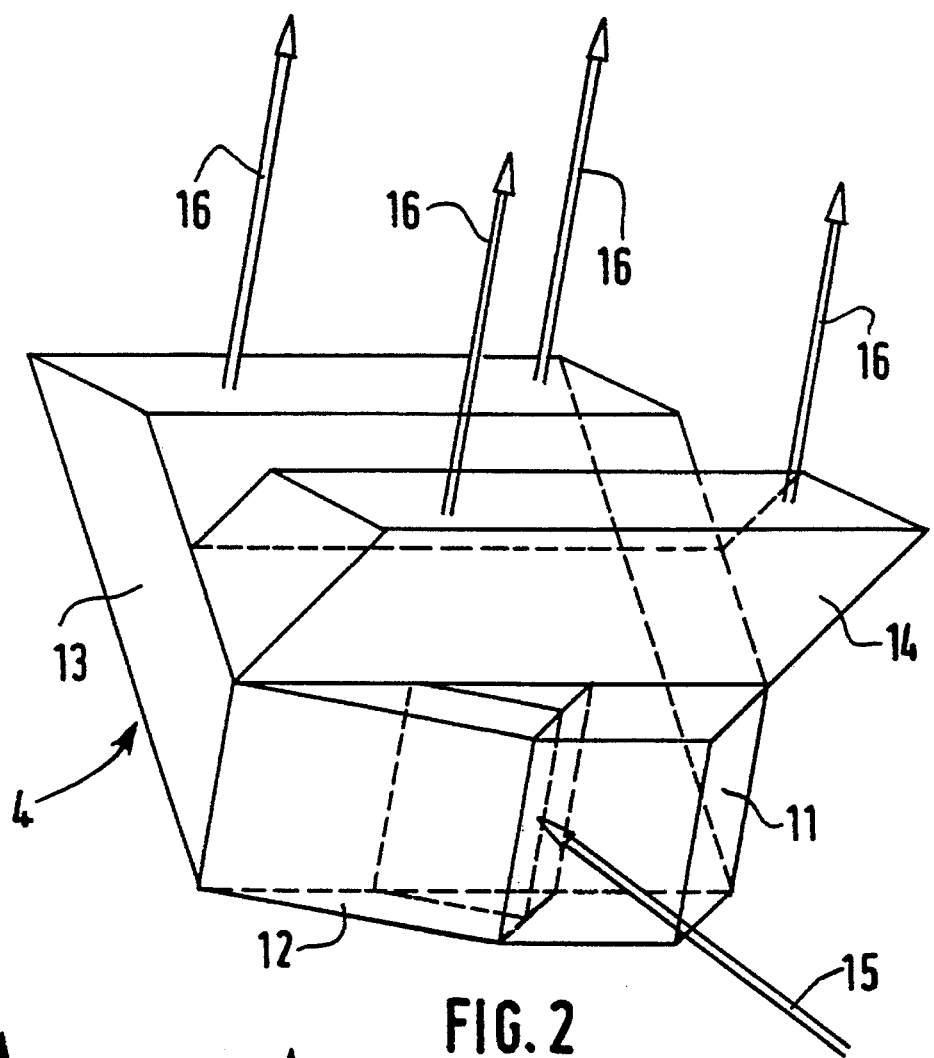
FIG. 2 is a perspective view of the beam splitter used in this probe.

The probe of FIG. 1 comprises an emitting source 1, for example a monomode diode laser at $\lambda=820$ nanometers, and which optionally contains a mechanical rotatable half-way plate or an electrically controlled Faraday rotator, in the beam path, for eliminating (selectively and temporarily) at least one of the fringe systems being generated, a collimator 2 for forming a parallel beam, and an anamorphoser 3 enabling a beam with a circular cross section to be obtained.

The beams coming from diode lasers generally possess an elliptical cross section. The anamorphoser 3 enables the dimensions of the beam in the direction parallel to the major axis of the ellipse to be reduced so as to form a beam having a circular cross section. It would be possible for the anamorphoser 3 to be produced using prisms, but it is preferably produced, as here, in the form of a cylindrical lens, this being less bulky and making it possible to emerge from the anamorphoser in the direction of the incident beam.

The beam output by the anamorphoser 3 enters a four-way splitter prism 4 which will be described hereinbelow. The prism 4 makes it possible to obtain, as output, four parallel laser beams aligned along the four edges of a prism having a square cross section.

These four beams are reflected by a mirror 5 toward an optical collimation device 6 preferably consisting, as here, of an aspherical single lens. As shown, the beams pass through a Faraday rotator with an optional mask element represented by block 20, which can eliminate at least one of the fringe systems or change the polarization of the beams.

The lens 6 makes the four light beams converge in the measurement zone located, for example, some ten centimeters away, where the interference patterns are formed.

The particles passing through this measurement zone, and consequently the interference patterns, backscatter the light toward the lens 6. Next, this backscattered light passes through an optical filter 7 and then an optical focusing device 8, for example one identical to the optical device 6.

The optical device 8 makes the backscattered light converge toward a photoreceiver 9 which consequently delivers a signal representing this backscattered light.

This signal is transmitted to a processing unit 10 which determines the frequency peaks of this signal and deduces therefrom the components of the velocity of the particles in the measurement zone.

The splitter 4 is composed of four prisms 11, 12, 13 and 14.

The prism 11 possesses a rhomb shaped cross section and its entrance face is perpendicular to the incident beam 15. The prism 12 has a rectangular-trapezoid shaped cross section and its rectangular side is applied against the prism 11, while its opposite side is perpendicular to the incident beam. This opposite side, as well as the side of the rhomb 11 opposite the entrance side are in the same plane and are applied against the entrance face of the prism 13.

This prism 13 is a prism having an isosceles-trapezoidal cross section, the entrance to which prism takes place via one of the non-parallel faces.

Finally, the prism 14 is a prism of the same type as the prism 12, and its rectangular side is applied against the small base of the prism 13.

Figure 3A:
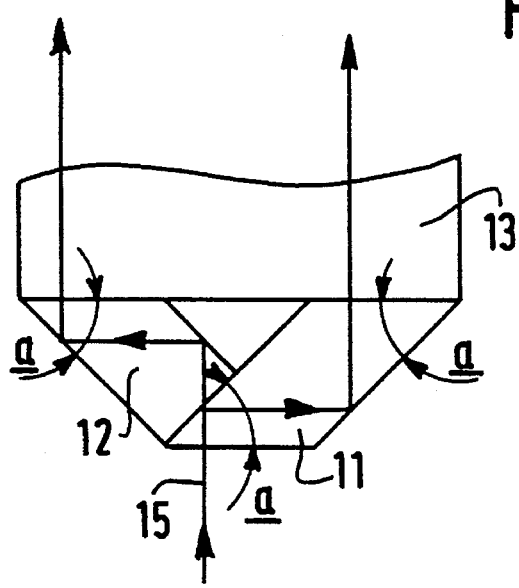
FIGS. 3a and 3b illustrate the operation of the splitter of FIG. 2.
Figure 3B:
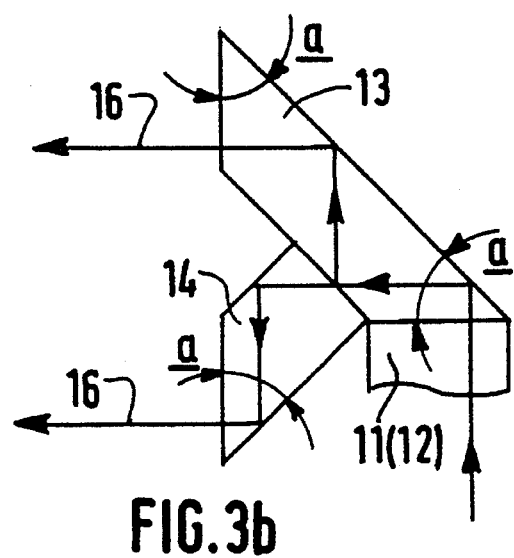

The angles a of FIGS. 3a and 3b are equal to 45°.

The prisms 12 and 14 are treated in such a way that, once they are assembled with the prisms 11 and 13, the interfaces 11-12 and 13-14 are semi-reflecting at the wavelength in question.

As may be seen in FIG. 3a, the incident beam 15 is split a first time into two beams at the interface between the prisms 11 and 12. These two beams, after reflection, penetrate the prism 13 so as to be parallel to each other. Next, these two beams are each split into two beams at the interface between the prisms 13 and 14, as shown in FIG. 3b. After reflection, this results in four parallel output beams 16 which, if the dimensions of the prisms 11-14 are suitably chosen, are aligned with the four edges of a prism having a square cross section.

The output beams 16 are furthermore orthogonal to the incident beam 15.

This configuration of the four beams presents, of course, only one special case. In the general case, which enables 3 independent components of the velocity to be obtained, at least 3 mutually interfering light beams are used, these beams then having to be at different distances from the optical axis of the focusing lens. Moreover, it is necessary for the angles between the interfering beams to be sufficiently large in order to be able to differentiate the components of the velocity easily.

I claim:

1. Laser velocimetric probe which includes means for simultaneously generating at least two interference fringe systems in a single measurement volume and measurement means for determining at least two components of the velocity of a particle passing through the fringe field from a signal representing the light backscattered by this particle, characterized in that said fringe systems have the same wavelength and that the measurement means are arranged in order to determine said at least two components of the particle velocity by frequency analysis of said signal.

2. Probe according to claim 1, in which the means for generating the interference fringe systems comprise means for forming four parallel laser beams.

3. Probe according to claim 2, in which the four beams form the edges of a prism having a rhomb shaped or rectangle shaped base, and especially a square shaped base.

4. Probe according to claim 1, in which the means for generating the fringe systems comprise means for forming laser beams of different intensities.

5. Probe according to claim 1, which includes means which temporarily and selectively eliminates at least one of the fringe systems.

6. Probe according to claim 5, in which the means for eliminating fringe systems comprise means for changing the polarization of the beams from which these systems are obtained.

* * * * *